US012166373B2

United States Patent
Utz

(10) Patent No.: US 12,166,373 B2
(45) Date of Patent: Dec. 10, 2024

(54) CIRCUIT ARRANGEMENT FOR SUPPLYING CURRENT TO AN ELECTROLYSIS DEVICE AND A METHOD FOR OPERATING THE CIRCUIT ARRANGEMENT

(71) Applicant: Siemens Energy Global GmbH & Co. KG, Munich (DE)

(72) Inventor: Peter Utz, Furth (DE)

(73) Assignee: Siemens Energy Global GmbH &Co. KG, Munich (DE)

( * ) Notice: Subject to any disclaimer, the term of this patent is extended or adjusted under 35 U.S.C. 154(b) by 637 days.

(21) Appl. No.: 17/044,809

(22) PCT Filed: Apr. 15, 2019

(86) PCT No.: PCT/EP2019/059616
§ 371 (c)(1),
(2) Date: Oct. 1, 2020

(87) PCT Pub. No.: WO2019/201831
PCT Pub. Date: Oct. 24, 2019

(65) Prior Publication Data
US 2021/0140057 A1 May 13, 2021

(30) Foreign Application Priority Data
Apr. 19, 2018 (EP) ..................... 18168178

(51) Int. Cl.
*H02J 7/02* (2016.01)
*C25B 1/04* (2021.01)
(Continued)

(52) U.S. Cl.
CPC ............. *H02J 7/02* (2013.01); *C25B 1/04* (2013.01); *C25B 9/23* (2021.01); *C25B 9/65* (2021.01);
(Continued)

(58) Field of Classification Search
CPC ..................... H02J 7/00; H02J 7/02
See application file for complete search history.

(56) References Cited

U.S. PATENT DOCUMENTS 4,581,573 A * 4/1986 Dobsa ............... H01F 27/38
323/356
5,726,849 A 3/1998 Nakamura
(Continued)

FOREIGN PATENT DOCUMENTS

CN  202001202 U  10/2011
CN  103108997 A   5/2013
(Continued)

OTHER PUBLICATIONS

Guibert et al, "DC/DC Converter Topologies for Electrolyzers: State-of-theart and Remaining Key Issues", Jun. 18, 2017, International Journal of Hydrogen Energy (2017) (Year: 2017).*
(Continued)

*Primary Examiner* — Adi Amrany
(74) *Attorney, Agent, or Firm* — Wolter Van Dyke Davis, PLLC

(57) ABSTRACT

A circuit arrangement and to a method for operating the circuit arrangement, particularly a circuit arrangement for the DC power supply of a plurality of parallel electrolysers, where the circuit arrangement has a rectifier which converts an input-side alternating voltage into an output-side first DC voltage. Each electrolyser is respectively connected in parallel to the output of the rectifier by a down converter converting the first DC voltage into a second DC voltage such that the second DC voltage drops over the electrolyser. Each of the down converters is controllable and/or regulatable in order to adapt the level of the second direct voltage.

10 Claims, 2 Drawing Sheets

(51) Int. Cl.
    *C25B 9/23*         (2021.01)
    *C25B 9/65*         (2021.01)
    *C25B 13/00*       (2006.01)
    *C25B 15/02*       (2021.01)
    *H02M 3/155*      (2006.01)

(52) U.S. Cl.
    CPC .............. *C25B 13/00* (2013.01); *C25B 15/02* (2013.01); *H02M 3/155* (2013.01)

(56) References Cited

U.S. PATENT DOCUMENTS

| | | | |
|---|---|---|---|
| 5,768,117 A | 6/1998 | Takahashi et al. | |
| 8,347,645 B1* | 1/2013 | Miller | H01M 8/04231 |
| | | | 62/238.7 |
| 8,575,770 B2* | 11/2013 | Devine | C25B 15/02 |
| | | | 290/1 R |
| 9,702,049 B1* | 7/2017 | Parker | C25B 9/23 |
| 2006/0114642 A1* | 6/2006 | Liu | H02J 3/1892 |
| | | | 361/500 |
| 2008/0236647 A1* | 10/2008 | Gibson | H02J 3/381 |
| | | | 136/244 |
| 2010/0012219 A1* | 1/2010 | Shibukawa | F17C 5/06 |
| | | | 141/82 |
| 2011/0155583 A1* | 6/2011 | Li | C25B 1/04 |
| | | | 204/229.2 |
| 2013/0126337 A1 | 5/2013 | Grant | |
| 2013/0193941 A1 | 8/2013 | DeFazio | |
| 2014/0097093 A1 | 4/2014 | Showalter et al. | |
| 2015/0130440 A1* | 5/2015 | Kinoshita | H02M 3/158 |
| | | | 323/311 |
| 2017/0047858 A1* | 2/2017 | Hettel | H02M 7/1626 |
| 2017/0126133 A1* | 5/2017 | Yang | H02M 3/33576 |
| 2017/0324103 A1* | 11/2017 | Matsuyama | C25B 15/02 |
| 2018/0267567 A1* | 9/2018 | Lo | G05F 3/02 |
| 2019/0146038 A1* | 5/2019 | Matsumoto | B60L 3/12 |
| | | | 324/430 |
| 2020/0002823 A1* | 1/2020 | Ono | C25B 9/73 |

FOREIGN PATENT DOCUMENTS

| | | | | |
|---|---|---|---|---|
| DE | 102014014091 A1 | | 3/2016 | |
| EP | 1437823 A1 | | 7/2004 | |
| JP | 2004244653 A | * | 9/2004 | |
| JP | 2007031813 A | | 2/2007 | |
| JP | 2017006569 A | * | 1/2017 | ............ A61M 16/12 |
| WO | 2010047884 A2 | | 4/2010 | |

OTHER PUBLICATIONS

Valverde et al, "Optimized Photovoltaic Generator—Water Electrolyzer Coupling Through a Controlled DC-DC Converter", Nov. 13, 2007, International Journal of Hydrogen Energy (2008) (Year: 2008).*

PCT International Search Report and Written Opinion of International Searching Authority mailed Jul. 11, 2019 corresponding to PCT International Application No. PCT/EP2019/059616 filed Apr. 15, 2019.

* cited by examiner

CIRCUIT ARRANGEMENT FOR SUPPLYING CURRENT TO AN ELECTROLYSIS DEVICE AND A METHOD FOR OPERATING THE CIRCUIT ARRANGEMENT

CROSS REFERENCE TO RELATED APPLICATIONS

This application is the US National Stage of International Application No. PCT/EP2019/059616 filed 15 Apr. 2019, and claims the benefit thereof. The International Application claims the benefit of European Application No. EP18168178 filed 19 Apr. 2018. All of the applications are incorporated by reference herein in their entirety.

FIELD OF INVENTION

The invention relates to a circuit arrangement for supplying DC current to multiple electrolysers connected in parallel. Furthermore, the invention relates to a method for operating such a circuit arrangement and to an electrolysis device.

BACKGROUND OF INVENTION

Electrolysis, that is to say processes in which a chemical reaction is brought about using electric current, is employed in many technical fields and is used for example to produce various substances. For example the electrolysis of water can produce hydrogen and oxygen. To operate electrolysis apparatuses, also called electrolysis stacks or electrolysers, it is desirable, particularly on an industrial scale, if they can be operated in as energy-efficient and as safe a manner as possible.

It has been known hitherto that multiple electrolysers are connected in series for this purpose, each of the electrolysers being supplied with power via a separate DC isolated circuit comprising a transformer having a tap changer for coarse control of the electrolysers and a rectifier having a thyristor circuit for fine control of the electrolysers, which is a very complex implementation. As an alternative, to reduce the circuitry, it is also known for the electrolysers to be connected in parallel and also operated via a rectifier, but this can result in a current distribution according to the resistance ratios of the electrolysers and hence in substantial derating and also the risk of operation of one or more electrolysers outside of their safe operating ranges.

SUMMARY OF INVENTION

The invention is based on the object of specifying an improved circuit arrangement for supplying DC current to multiple electrolysers connected in parallel.

To achieve this object, there is provision according to the invention for the circuit arrangement to comprise a rectifier that converts an input-side AC voltage into an output-side first DC voltage, wherein each electrolyser is connected in parallel with the output of the rectifier via a respective down-converter, which converts the first DC voltage into a second DC voltage, such that the second DC voltage is dropped across the electrolyser, wherein each of the down-converters is controllable and/or variable to adapt a level of its second DC voltage.

The advantage of the solution according to the invention is that each of the electrolysers connected in parallel is operated via an interposed down-converter by the first DC voltage produced by the rectifier, wherein the second DC voltage used to operate the electrolyser can be adjusted by controlling and/or varying the down-converters. In this way, all of the electrolysers can be operated at a separate operating point, which can thus always be kept in a safe operating range (safe operation area).

As a result of the rectifier that produces the first DC voltage, the invention advantageously uses only one central feed for the DC current, which considerably reduces the complexity of the circuit in comparison with a series connection of the electrolysers. However, the invention's use of the controllable and/or variable embodiment of down-converters for each electrolyser advantageously allows the flow of current through each electrolyser to be adapted even when the electrolysers are connected in parallel. The problems that arise when the electrolysers are operated without the down-converters, such as a current distribution according to the resistance ratios of the electrolysers and a resultant substantial derating and/or the risk of operation of an electrolyser outside its safe operating range, can therefore be avoided by the circuit arrangement according to the invention. The controllability and/or variability of the down-converters therefore advantageously allows safe and more efficient operation of the circuit arrangement and hence of the electrolysers to be achieved in particular even if the resistance ratios of the electrolysers change. Effects that can lead to a change of resistance of the electrolysers, such as for example aging of the electrolysers and/or temperature-related effects, can be taken into consideration or compensated for by the controllability and/or variability of the electrolysers.

In comparison with a series connection of electrolysers that are each supplied with power via a separate DC isolated circuit comprising a transformer having a tap changer for coarse control and a rectifier having a thyristor circuit for fine control, the circuit arrangement according to the invention results in the advantage that the rectifier can be supplied with power by a simple converter transformer without a tap changer. Furthermore, the use of a single transformer instead of multiple smaller transformers allows the iron losses in the transformer to be reduced. The circuit arrangement according to the invention results in a particularly compact design for the supply of DC current to the electrolysers. This leads to a reduction in the material used for connecting or providing a rail system for the electrolysers, for example copper or aluminum.

For the purpose of controlling and/or varying the down-converters, the circuit arrangement can comprise for example a computing unit connected to the down-converters.

To improve the energy efficiency of the circuit arrangement, there may be provision according to the invention for the circuit arrangement to comprise multiple switches, wherein each down-converter is bypassable by a respective switch. When a down-converter is bypassed, the first DC voltage is dropped completely across the electrolyser connected to the bypassed down-converter. For bypassed down-converters, the second DC voltage thus corresponds to the first DC voltage. Operation of the down-converter such that the second DC voltage, that is to say the output voltage of the down-converter, is as far as possible of the same magnitude as the first DC voltage, that is to say the input voltage of the down-converter, can be replaced by the bypassing of the down-converter, which means that the losses that would arise in the event of such operation of the down-converter can be avoided. It is thus advantageously possible, in order to achieve particularly energy-efficient operation of the circuit arrangement according to the invention, for only the electrolysers having the lowest resistances to be supplied with power via the down-converter, whereas the others are supplied with power directly using the first DC voltage. The switches can be controlled by a computing device of the circuit arrangement, for example, the computing device in particular also being able to be designed to control and/or vary the down-converters.

For the down-converters, there may be provision according to the invention for each down-converter to comprise at least one energy-storage inductor and at least one transistor, which are connected in series with the electrolyser connected to the down-converter. Furthermore, the down-converter can comprise a diode, which is connected in parallel with the electrolyser connected to the down-converter. The transistor of the down-converter acts as a switch in this case, with control of the transistor allowing the output voltage of the down-converter, that is to say its second DC voltage, to be controlled and/or varied. For example the output voltage can be controlled and/or varied by means of pulse width modulation, the output voltage being dependent on the duty factor, that is to say therefore on a ratio between the on and off states of the transistor within a time interval. Each down-converter comprises a separate transistor, which means that the second DC voltage provided by each down-converter for supplying the electrolyser with power is individually adjustable and hence also individually controllable and/or variable.

In a configuration of the invention, there may be provision for the rectifier to be controllable and/or variable to adapt a level of the first DC voltage. By controlling and/or varying the rectifier it is possible to adapt the level of the first DC voltage produced by the latter. Since the first DC voltage is the input voltage of the down-converters connected in parallel, a change in the first DC voltage also leads to a change in the second DC voltage. Simultaneous variability or controllability of the rectifier and the down-converters affords the advantage that for example the energy-storage inductors of the down-converters can be embodied with a smaller physical size, since the controllability or variability of the rectifier means that the first DC voltage is variable at least within a certain voltage range, which means that the down-converters must likewise be variable only within a smaller voltage range, without the overall result being a limitation of the available voltage range for an adaptation of the second DC voltage. In particular, it is possible for control or variation of the rectifier to allow a coarser adaptation, relating to all of the electrolysers, of the first DC voltage to take place and for control and/or variation of the down-converters to allow a finer adaptation of the respective second DC voltages feeding one of the electrolysers to take place.

The use of a variable rectifier furthermore affords the advantage that the rectifier can be connected to a simple converter transformer and it is not necessary to use a variable transformer, for example a transformer having a tap changer.

According to the invention, there may be provision for the rectifier to comprise a thyristor assembly. The thyristor assembly of the rectifier permits the first DC voltage produced by the rectifier to be varied at least in a certain order of magnitude. In the case of a rectifier having a thyristor assembly, the first DC voltage produced by the rectifier can be varied using the trigger time of the thyristors of the thyristor assembly, for example.

In an embodiment of the invention, there is provision for the circuit arrangement to comprise a capacitor, which is connected in parallel with the output of the rectifier. This capacitor allows the energy that can be taken from the DC-DC voltage converter to be buffered. The capacitor therefore has a stabilizing effect on the first DC voltage, and this advantageously affects control or variation of the rectifier and/or of the down-converters.

To operate the rectifier, there may be provision according to the invention for the input side of the rectifier to be connected to a secondary of a transformer that converts a first AC voltage present on a primary of the transformer into a second AC voltage present on the secondary. The second AC voltage is the input-side AC voltage of the rectifier in this case. Both the first AC voltage and the second AC voltage may be a high voltage. For example it is possible for a first AC voltage to be employed in a voltage range between 6 kV and 100 kV. The second AC voltage can be between 100 V and 1 kV, for example. Depending on the configuration of the transformer and/or on the requirements of the rectifier, it is naturally also possible to employ a first AC voltage and a second AC voltage in other voltage ranges.

Furthermore, there may be provision according to the invention for the transformer to comprise a tertiary, which is connected to a passive filter. The passive filter can comprise for example at least one coil and/or at least one capacitor and be adapted such that at least one harmonic of the rectifier is filtered. The at least one harmonic of the rectifier can result from a control frequency used to control one or more switchable components of the rectifier, for example.

For an electrolysis device according to the invention, there is provision for said electrolysis device to comprise at least one circuit arrangement according to the invention and multiple electrolysers, wherein each of the electrolysers comprises at least one proton exchange membrane. These can be in particular proton exchange membranes for producing hydrogen by electrolysis of water, in particular deionized and/or distilled water. The electrolysers can in particular also be embodied as electrolysis stacks comprising multiple proton exchange membranes. The electrolysis device can comprise any number of electrolysers connected in parallel, depending on the performance of the rectifier or depending on a maximum current needing to be drawn via the rectifier.

For a method according to the invention for operating a circuit arrangement according to the invention, there is provision for the second DC voltages to be controlled and/or varied on the basis of an amount of substance produced by at least one of the electrolysers by electrolysis and/or on the basis of an operating point of at least one of the electrolysers. The second DC voltages are in this case varied and/or controlled, as already described for the circuit arrangement, by varying and/or controlling the respective down-converter. The second DC voltages can be varied on the basis of an amount of substance produced by all or an amount of substance produced by at least one of the electrolysers, for example. In the case of electrolysis of water, the amount of substance can be the amount of hydrogen produced by the electrolyser(s), for example. Additionally or alternatively, it is possible for the second DC voltages to be varied on the basis of an operating point of at least one of the electrolysers. The operating point can be determined by the resistance of the electrolyser and/or by a flow of current through the electrolyser, for example. The flow of current through the electrolyser is dependent on its resistance and on the level of the second DC voltage dropped across the electrolyser.

Furthermore, there may be provision according to the invention for the circuit arrangement to comprise multiple switches, wherein each down-converter is bypassable by a respective switch, wherein the switches are controlled on the basis of an amount of substance produced by at least one of the electrolysers by electrolysis and/or on the basis of an operating point of at least one of the electrolysers. The switches can be controlled as part of the variation of the second DC voltage, with the closing of a switch allowing the respective down-converter to be bypassed. When a down-converter has been bypassed, the second DC voltage dropped across the electrolyser associated with the down-converter corresponds to the first DC voltage produced by the rectifier. This allows only the electrolysers having the lowest resistance to be supplied with power by the down-converter, whereas the other electrolysers are supplied with power by the rectifier directly using the first DC voltage. To control the switches, there may be provision for the circuit arrangement to comprise a computing device by means of which the switches are controllable. Furthermore, the computing device can use suitable measuring means, for example, to also determine an amount of substance and/or a resistance of one or more electrolysers or a flow of current through one or more electrolysers, and these quantities can be taken as a basis for controlling and/or varying the down-converters.

According to the invention, there may be provision for the rectifier to be controlled and/or varied to adapt a level of the first DC voltage. In particular, it is possible for control or variation of the rectifier to allow a coarser adaptation, relating to all of the electrolysers, of the first DC voltage to take place and for control and/or variation of the down-converters to allow a finer adaptation of the respective second DC voltages feeding one of the electrolysers to take place. The control and/or variation of the rectifier can naturally also take place on the basis of an amount of substance produced by all or an amount of substance produced by at least one of the electrolysers and/or on the basis of an operating point of at least one of the electrolysers.

BRIEF DESCRIPTION OF THE DRAWINGS

Further advantages and details of the invention will be obtained from the exemplary embodiments described below and from the drawings, in which.

DETAILED DESCRIPTION OF INVENTION

Figure 1:
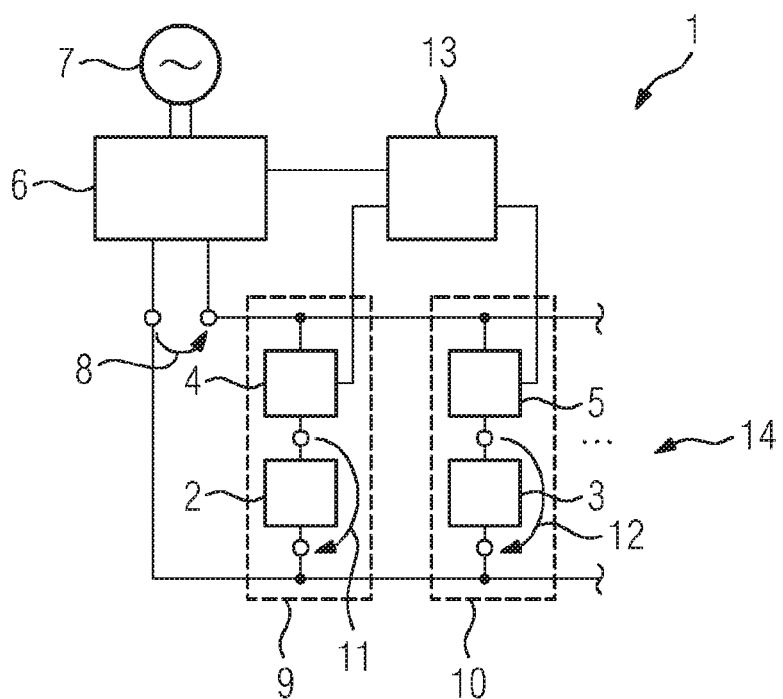
FIG. 1 shows a schematic block diagram of a circuit arrangement according to the invention.

FIG. 1 portrays a schematic depiction of a circuit arrangement 1 according to the invention. The circuit arrangement 1 is used for supplying DC current to multiple electrolysers 2, 3 connected in parallel, wherein each of the electrolysers 2, 3 is connected in parallel with the output of a rectifier 6 via a down-converter 4, 5. The rectifier 6 converts an AC voltage 7 present on the input side into a first DC voltage 8. This first DC voltage 8 is dropped across the branches 9, 10 comprising in each case one of the electrolysers 2, 3 and one of the down-converters 4, 5.

The first DC voltage 8 is converted by the down-converter 4 into the second DC voltage 11, which is dropped across the electrolyser 2. Accordingly, the first DC voltage 8 is likewise converted by the second down-converter 5 into the second DC voltage 12, which is dropped across the electrolyser 3. In addition to the two depicted electrolysers 2, 3, the circuit arrangement can naturally also be used for supplying DC voltage to further electrolysers, which are accordingly likewise connected in parallel with the output of the rectifier 6 via a respective down-converter as a further branch.

In order to be able to operate the electrolysers 2, 3 at a desired operating point, which is within a safe operating range, for example, the down-converters 4, 5 are controllable and/or variable to adapt a level of the second DC voltage 11 or 12. In addition, the rectifier 6 may also be controllable and/or variable to adapt a level of the first DC voltage 8. In particular, there may be provision for both the rectifier 6 and the down-converters 4, 5 and also further down-converters possibly present in further branches to be controllable or variable. To control or vary the rectifier 6 and/or the down-converters 4, 5, the circuit arrangement 1 can comprise a computing device 13, for example, by means of which the rectifier 6 and/or the down-converters 4, 5 can be controlled or varied. The computing device 13 may be connected to one or more measuring means (not depicted here) for this purpose, which can be used to measure for example an amount of substance produced by one of the electrolysers 2, 3, a respective resistance of one or more of the electrolysers 2, 3 and/or a respective flow of current through one or more of the electrolysers 2, 3. The control and/or variation of the rectifier 6 to adapt the level of the first DC voltage 8 or a control or variation of the down-converters 4, 5 to adapt the level of the second DC voltages 11, 12 can take place on the basis of the determined amount of substance and/or on the basis of the respective resistance of the electrolysers 2, 3 and/or the respective flow of current through the electrolysers 2, 3, for example. This also applies accordingly to further electrolysers and further down-converters that may be present in addition to the branches 9, 10. The down-converters 4, 5 and further down-converters possibly present are part of the circuit arrangement 1, to which the electrolysers 2, 3 and further electrolysers possibly present can be connected. In addition to the circuit arrangement 1, an electrolysis device 14 according to the invention also comprises all of the electrolysers connected to said circuit arrangement. Each of these can comprise at least one proton exchange membrane, for example, the proton exchange membrane being designed in particular to produce hydrogen by the electrolysis of deionized and/or distilled water.

Figure 2:
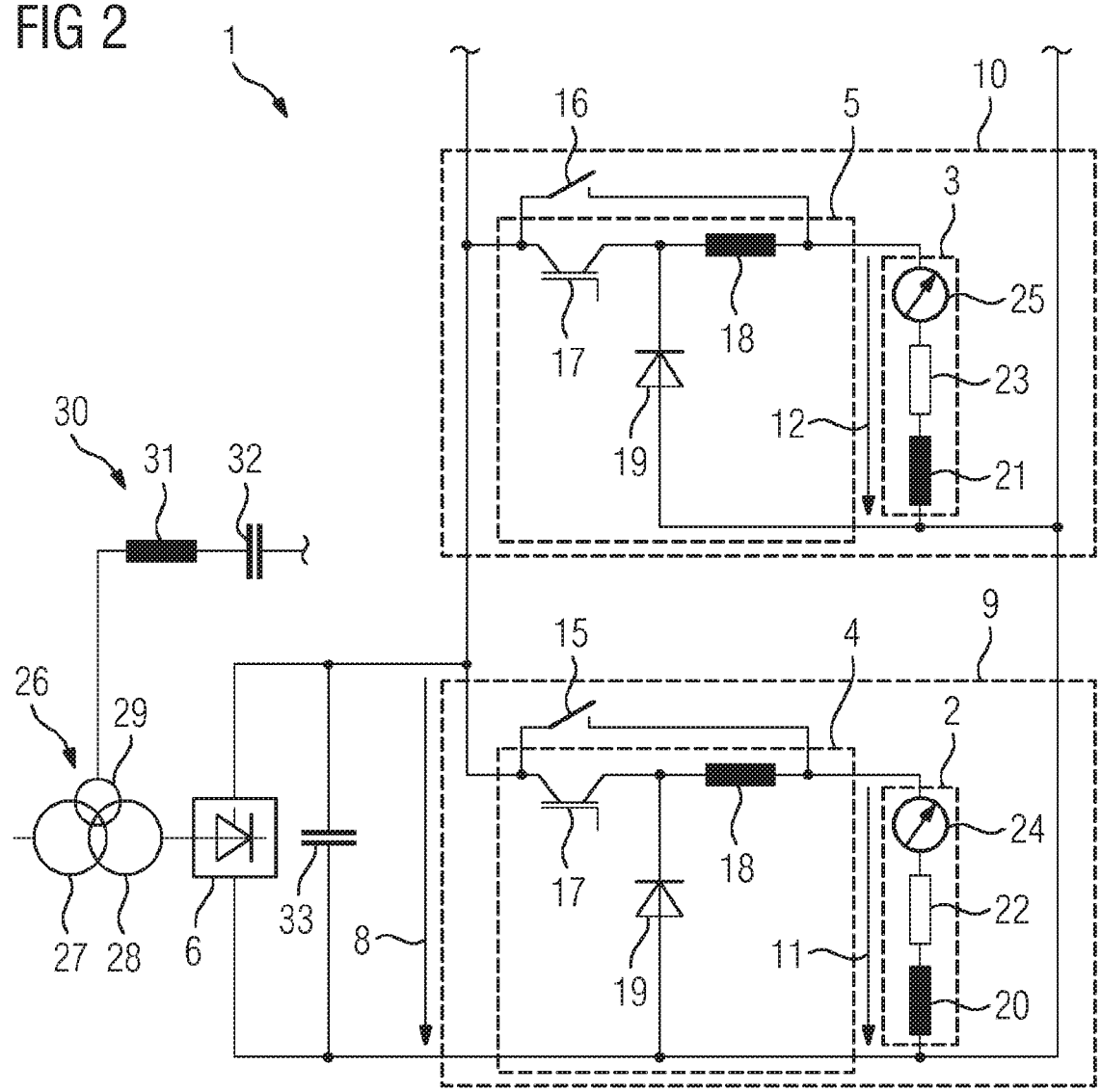
FIG. 2 shows a schematic circuit diagram of a circuit arrangement according to the invention.

FIG. 2 depicts a schematic circuit diagram of a circuit arrangement 1 according to the invention. In accordance with the portrayal in FIG. 1, the branch 9 comprises the electrolyser 2 and the down-converter 4. Furthermore, the branch 9 in this exemplary embodiment comprises a switch 15 of the circuit arrangement 1, by means of which the DC-DC voltage converter 4 can be bypassed. The branch 10 accordingly comprises the electrolyser 3 and also the down-converter 5 and the switch 16 of the circuit arrangement 1.

Each of the down-converters 4, 5 comprises a transistor 17, an energy-storage inductor 18 and a diode 19. Each of the transistors 17 and the energy-storage inductors 18 is arranged in series with the respective electrolyser 2 or 3 supplied with power via the down-converter. Each of the diodes 19 is accordingly connected in parallel with the respective electrolyser 2, 3. The transistor 17 can be used to vary the level of the respective second DC voltage 11, 12 provided by the down-converter 4 or 5 and dropped across the electrolyser 2 or 3. To this end, the transistors 17 may be connected to the computing device 13 (not depicted here), for example, with the applicable control for varying and/or controlling the down-converters 4, 5 taking place via the computing device 13. Furthermore, it is possible for the switches 15, 16 to be controllable, in particular likewise via the computing device 13, so that when the switch 15, 16 is closed the down-converters 4, 5 are bypassed. When the down-converter 4, 5 is bypassed, that is to say when the switch 15, 16 is closed, the first DC voltage 8 produced by the rectifier 6 is dropped directly across the electrolyser 2 or 3, that is to say that the electrolysers are supplied with power from an intermediate circuit for the first DC voltage 8.

The rectifier 6 in this exemplary embodiment comprises a thyristor assembly, which means that the level of the first DC voltage 8 can be adapted by controlling the rectifier 6. To stabilize the first DC voltage 8 produced by the rectifier 6, there is furthermore provision for a capacitor 33, which is connected in parallel with the output of the rectifier 6. The opportunity to be able to influence the level of the second DC voltages 11, 12 simply by adapting the level of the first DC voltage 8 allows the size of the energy-storage inductors 18 in the down-converters 4, 5 to be kept down.

The electrolysers 2, 3 connected to the circuit arrangement 1 comprise a proton exchange membrane, for example, an inductance 20, 21 and a resistor 22, 23 being depicted as an equivalent circuit diagram for each of said electrolysers in FIG. 2. The electrolysers 2, 3 are fed by means of the second DC voltages 11, 12 provided by the circuit arrangement 1 and are used to produce one or more substances by electrolysis. Each of the electrolysers 2, 3 can be assigned a measuring means 24, 25, which can be used to measure the flow of current through the respective electrolyser 2, 3, for example. The flow of current measured by the measuring means 24, 25 can be taken as a basis for controlling and/or varying the rectifier 6 and/or the down-converters 4, 5.

In this exemplary embodiment, a variability of the rectifier 6 is obtained for example as a result of the choice of a trigger time for the thyristors of the thyristor assembly of the rectifier 6. The second DC voltages 11, 12 produced by the down-converters 4, 5 can additionally be adapted by controlling the transistors 17, for example by pulse width modulation. In addition or as an alternative to a current measurement, the measuring means 24, 25 can also determine the voltage drop across the respective electrolyser 2, 3 and/or can determine its resistance, wherein the rectifier 6 and/or the down-converters 4, 5 can additionally or alternatively also be varied on the basis of one of these quantities. The resistances 22, 23 of the electrolysers 2, 3 can change during operation. The reason for such a resistance change may be aging effects in the electrolyser 2, 3 and/or temperature changes or the like, for example. The operation of the circuit arrangement 1 as provided for according to the invention can compensate for such effects by adapting the level of the first DC voltage 8 by controlling and/or varying the rectifier 6 and/or by adapting the level of the second DC voltage 11, 12 by controlling and/or varying the down-converters 4, 5.

Current is supplied to the rectifier 6 in this exemplary embodiment via a transformer 26 that converts a first AC voltage present on a primary 27 into a second AC voltage present on a secondary 28. Both the first AC voltage and the second AC voltage may be a high voltage. For example it is possible for a first AC voltage in a range between 6 kV and 100 kV to be present on the primary, said first AC voltage being transformed into a second AC voltage in a voltage range between 100 V and 1 kV that is present on the secondary 28. The transformer 26 furthermore comprises a tertiary 29, to which a passive filter 30 is connected. The passive filter 30 comprises an inductance 31 and a capacitance 32. The filter 30 may be adapted such that it damps at least one harmonic produced by the rectifier 6, for example produced as a result of the switching of the thyristor assembly and/or one or more other switchable components of the rectifier 6. Such damping by the filter 30 has an advantageous effect on the control and/or variation of the first DC voltage 8 or the second DC voltages 11, 12.

The electrolysers 2, 3 can be used for example to produce hydrogen by electrolysis of water. Other purposes of use, such as for example for chlorine alkali electrolysis, are also conceivable, however.

A further opportunity for controlling and/or varying the first DC voltage 8 and/or the second DC voltages 11, 12 arises when the electrolysers 2, 3 are adjusted to a respective operating point. This operating point may be dependent on the amount of substance to be produced by the electrolysis, for example. In this case, there may be provision for additional measuring means (not depicted here) that measure an amount of substance currently produced by means of the respective electrolysers 2, 3, the computing device 13 subsequently being able to be used to control and/or vary the rectifier 6 and/or the down-converters 4, 5, for example.

Although the invention has been illustrated and described more specifically in detail by means of the preferred exemplary embodiment, the invention is not limited by the disclosed examples, and other variations can be derived therefrom by a person skilled in the art without departing from the scope of protection of the invention.

The invention claimed is:

1. A circuit arrangement supplying DC current, comprising:
    a rectifier that converts an input-side AC voltage into an output-side first DC voltage, the rectifier controllable to determine the first DC voltage
    a plurality of down-converters, each responsive to the first DC voltage for controllably converting the first DC voltage to a second DC voltage,
    a like plurality of electrolysers each connected to the output-side of a respective down-converter,
    a like plurality of first measuring devices for measuring the amount of substance produced by a respective electrolyser,
    a like plurality of second measuring devices for measuring an operating point of a respective electrolyser,
    a like plurality of third measuring devices for measuring a current of a respective electrolyser, and from the application of Ohm's Law, determining a resistance of a respective electrolyser based thereon,
    a like plurality of bypass switches directly connected, with no intervening components, between an input and an output of each down converter such that closing the switch bypasses the respective down-converter, the bypass switch controllable between only two configurations, an opened configuration and a closed configuration with no configurations between the opened and the closed configuration, when the bypass switch is in the opened configuration the first DC voltage is supplied to the down converter, the down converter acts on the first DC voltage to produce the second DC voltage, and the second DC voltage is supplied to the electrolyser, and when the bypass switch is in the closed configuration the bypass switch shorts the down converter input to the down converter output, thereby supplying the first DC voltage to the electrolyser, and
    a computing device for controlling the rectifier responsive to the plurality of the first, second, and third measuring devices to control the first DC voltage, and for controlling each down converters, responsive to the plurality of the first, second, and third measuring devices to control the second DC voltage, and for controlling each bypass switch, responsive to the plurality of the first, second, and third measuring devices, to the opened or the closed configuration.

2. The circuit arrangement as claimed in claim 1, wherein each down-converter comprises at least one energy-storage inductor and at least one transistor, which are connected in series with the electrolyser connected to the down-converter.

3. The circuit arrangement as claimed in claim 1, wherein the rectifier comprises a thyristor assembly.

4. The circuit arrangement as claimed in claim 1, wherein the circuit arrangement comprises a capacitor, which is connected in parallel with the output of the rectifier.

5. The circuit arrangement as claimed in claim 1, wherein the input side of the rectifier is connected to a secondary of a transformer that converts a first AC voltage present on a primary of the transformer into a second AC voltage present on the secondary.

6. The circuit arrangement as claimed in claim 5, wherein the transformer comprises a tertiary, which is connected to a passive filter.

7. The circuit arrangement as claimed in claim 1, wherein one or more electrolysers of the plurality of electrolysers having the lowest resistance, as determined by the respective second measuring devices, is responsive to the second DC voltage and all other electorlysers of the plurality of electrolysers are each responsive to the first DC voltage.

8. The circuit arrangement as claimed in claim 1, wherein the computing device controls the first DC voltage and the second DC voltage responsive to the amount of substance produced by one of the electrolysers or by the amount of substance produced by all of the electrolysers.

9. The circuit arrangement as claimed in claim 1, wherein one or both of the first and second DC voltages are determined to place operation of each electolyser at a desired operating point.

10. An electrolysis device, comprising:
at least one circuit arrangement as claimed in claim 1, and wherein each one of the plurality of electrolysers comprises at least one proton exchange membrane.

\* \* \* \* \*